United States Patent
Smith et al.

(10) Patent No.: US 10,496,658 B2
(45) Date of Patent: Dec. 3, 2019

(54) METHOD AND SYSTEM OF VISUALLY DEPICTING HIERARCHICAL DATA THROUGH SELECTIVE COLORIZATION

(71) Applicant: ADOBE INC., San Jose, CA (US)

(72) Inventors: Michael James Andrew Smith, San Francisco, CA (US); Gavin Murray Peacock, Walnut Creek, CA (US); Seth Walker, Minneapolis, MN (US); Adam Cath, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 494 days.

(21) Appl. No.: 13/830,115

(22) Filed: Mar. 14, 2013

(65) Prior Publication Data
US 2014/0282175 A1    Sep. 18, 2014

(51) Int. Cl.
| G06F 8/34 | (2018.01) |
| G06F 3/0481 | (2013.01) |
| G06F 3/0484 | (2013.01) |
| G05B 19/042 | (2006.01) |
| G06F 16/248 | (2019.01) |

(52) U.S. Cl.
CPC .................. *G06F 16/248* (2019.01)

(58) Field of Classification Search
CPC ....... G06F 3/0484; G06F 3/1446; G06F 3/147
USPC ............... 715/204, 240, 275, 713, 764, 771; 345/1.3
See application file for complete search history.

(56) References Cited

U.S. PATENT DOCUMENTS

| 6,356,285 | B1* | 3/2002 | Burkwald ................ G06F 8/75 345/440 |
| 8,001,155 | B2* | 8/2011 | Danton et al. ................ 707/798 |
| 8,074,207 | B1* | 12/2011 | Reilly ........................... 717/130 |
| 2001/0047372 | A1* | 11/2001 | Gorelik ............. G06F 17/30604 715/239 |
| 2006/0190432 | A1* | 8/2006 | Wang .............. G06F 17/30554 |
| 2011/0055427 | A1* | 3/2011 | Das ............................. 709/247 |
| 2011/0083074 | A1* | 4/2011 | Jellison, Jr. ........... G06F 3/0481 715/716 |
| 2012/0089914 | A1* | 4/2012 | Holt et al. ..................... 715/728 |
| 2012/0131487 | A1* | 5/2012 | Leonard ..................... 715/771 |
| 2013/0125057 | A1* | 5/2013 | Kashik ............. G06F 17/30994 715/852 |
| 2013/0249917 | A1* | 9/2013 | Fanning ............... G06T 11/206 345/440 |
| 2013/0263102 | A1* | 10/2013 | Ergan ..................... G06F 8/443 717/158 |
| 2013/0324848 | A1* | 12/2013 | Kuroki ................ A61B 5/021 600/438 |

(Continued)

*Primary Examiner* — Shourjo Dasgupta
(74) *Attorney, Agent, or Firm* — Shook, Hardy & Bacon, L.L.P.

(57) ABSTRACT

Method and systems of visually depicting hierarchical data are provided. The hierarchical data includes data pertaining to a plurality of categories, the hierarchical data further including data pertaining to a plurality of subcategories of at least one of the plurality of categories. Multiple viewing regions may then be displayed simultaneously on a display, each viewing region depicting a different view of the hierarchical data, objects displayed in each viewing region being color-coded with a different color for each category, such that an object corresponding to a first category in a first viewing region is displayed in an identical color as an object corresponding to the first category in a second viewing region.

19 Claims, 17 Drawing Sheets

(56) References Cited

U.S. PATENT DOCUMENTS

2013/0347104 A1* 12/2013 Raber ................ G06F 21/55
                                                      726/22
2014/0075380 A1*  3/2014 Milirud ............. G06F 11/323
                                                     715/810

* cited by examiner

METHOD AND SYSTEM OF VISUALLY DEPICTING HIERARCHICAL DATA THROUGH SELECTIVE COLORIZATION

FIELD

The present disclosure relates generally to visualizing hierarchical data through selective colorization.

BACKGROUND

A number of different systems produce large volumes of data that can be more easily understood and managed by dividing the data into categories that can in turn be subdivided into further categories. This is known as hierarchical data. Analysis of this data can typically be handled in a number of different ways. One example of a system that can generate hierarchical data is to use software known as a profiler. A software profiler uses a form of dynamic program analysis that measures, for example, the memory or time complexity of a software product, the usage of particular instructions, the frequency and duration of function calls, etc. This aids the designer of the software product in the optimization of the software product. Hierarchical data provides a particular challenge for profilers. If it is simply examined as plain data, it can be difficult to quickly locate information of interest.

Existing profilers generate a list of function calls, along with a frequency count. Modern profilers may additionally provide a user interface to let the user visualize this better by showing a chart of activity over time. The chart is an aggregation of raw data, but profilers do not make it easy to get back to the raw data from the chart data. Some tools also allow the user to turn on and off different categories in the chart. The data displayed in the chart, however, is not visually related to other data that may be relevant, such as function calls. For example, if a user sees that rendering is taking a lot of time, the user would be unable to look at the sequence of function calls and see those that are related to rendering in order to link the data to the chart. This makes analysis more difficult.

Additionally, traditional profilers limit categorization to a few high-level categories, despite the fact that users could benefit from seeing further levels of detail (e.g., breaking down rendering into text rendering, bitmaps, etc.).

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Disclosed herein is a method and system of visualizing hierarchical data through selective colorization. In an example embodiment, a data visualizer is used to analyze the hierarchical data and the visualization is produced and interacted with via a user interface of the data visualizer.

Hierarchical data is data that can be categorized into a plurality of levels. A system of hierarchical categories is a tree. A categorization of data is a one-to-many function that maps each item of data onto a leaf node of the tree. A data item belongs to a category if the node corresponding to this category is equal to, or a parent of, the node that the data item maps to according to the categorization.

Figure 1:
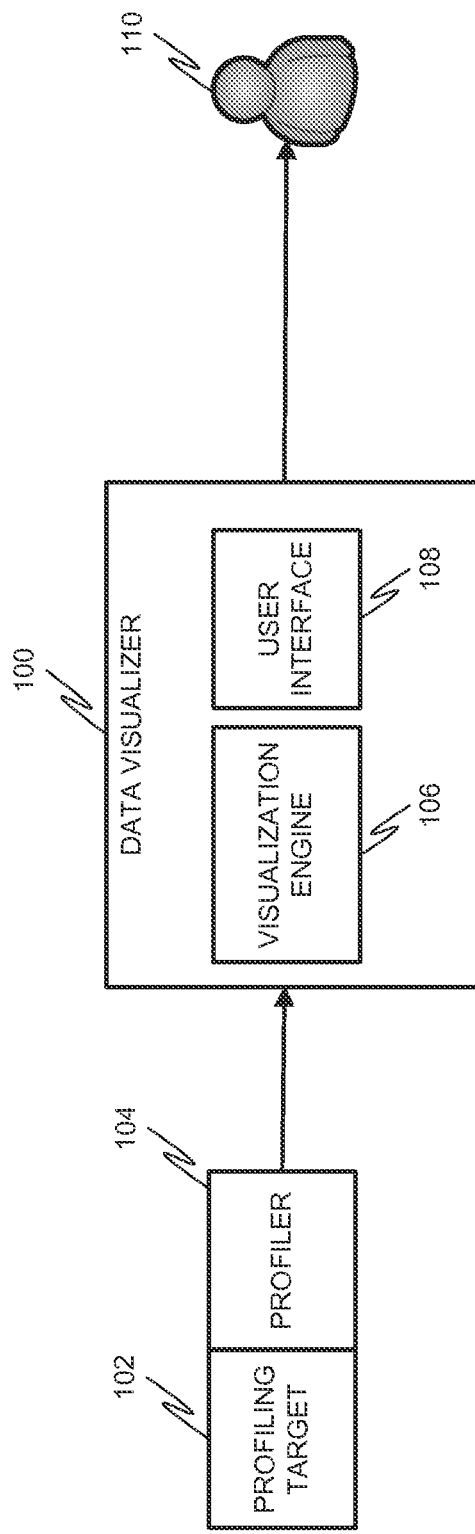
FIG. 1 is a block diagram illustrating a data visualizer in accordance with an example embodiment.

The term "data visualizer" as used throughout this disclosure shall be interpreted broadly to mean any tool used to visually analyze data. FIG. 1 is a block diagram illustrating a data visualizer in accordance with an example embodiment. The data visualizer 100 receives input data about a profiling target 102 from a profiler 104. The profiler 104 may, in some example embodiments, be integrated into and inseparable from the profiling target 102. The profiler 104 tracks certain information in the profiling target 102 and creates hierarchical data to output as the input data to the data visualizer 100. In some example embodiments, the profiler 104 is a separate unit. The data visualizer 100 may include a visualization engine 106 and a user interface 108. The visualization engine 104 acts to organize the input data and present the input data in a meaningful way to a user 110 via the user interface.

In some example embodiments, the data visualizer 100 in question may interface with a profiler designed to aid programmers or other users in analyzing and optimizing software products. One such data visualizer is ADOBE SCOUT™ from Adobe Systems. Inc. of San Jose, Calif. ADOBE SCOUT™ is a data visualizer that allows a user to optimize created content, such as content compatible with ADOBE FLASH PLAYER™ of Adobe Systems, Inc. of San Jose, Calif.

In some example embodiments, the profiling target 102 may be a user-scriptable engine. Examples of user-scriptable engines include, but are not limited to, ADOBE FLASH PLAYER™ as well as web browsers (such as Chrome™ from Google, Inc. of Mountain View, Calif.) operating hypertext markup language 5 (HTML 5). In this case, the profiler 104 is also embedded in ADOBE FLASH PLAYER™.

ADOBE FLASH PLAYER™ is software used to view multimedia. It typically runs from a web browser or mobile device, allowing multimedia files created for the software to be viewed on a number of different platforms without the need to modify the multimedia files. The multimedia files are stored in a format known as a SWF file. The SWF files contain static data, such as images, and dynamic data, such as scripts. The scripts are usually written in a language known as ActionScript, which are executed at certain points in time to allow for modification of screen objects and to allow for interactivity. The various activities that are executed in ADOBE FLASH PLAYER™ then generally fall into the category of either native commands or user-defined commands. The native commands are commands executing native functionality of the user-scriptable engine, typically written in C++ code, while user-defined commands are, as described above, typically written in ActionScript.

Many SWF files are used to define applications, especially games, that perform a great deal of graphical animation. The basic principle is to redraw the screen at a certain frequency, for example 60 times a second, so that it appears as a smooth animation. Each of these redraws is known as a frame, and the frequency of refreshing is known as the framerate, which can be defined in each SWF file.

Within a frame, ADOBE FLASH PLAYER™ has many different activities to perform. This might include redrawing part of the screen, starting a new file download, mouse, keyboard, or other events, for example. Thus, one common analysis of a SWF file application is to determine whether the activities that need to be performed for a given frame can actually be performed in the amount of time allowed for that frame, given the framerate. For example, if the framerate is 60 times a second, then the activities for a given frame must be able to be performed in 1/60 of a second, or else the ultimate animation may be appear choppy or otherwise hindered. By connecting the ADOBE FLASH PLAYER™ to the ADOBE SCOUT™ data visualizer, the user can identify frames that fail this metric and allow the user to easily identify which particular activities are causing the problem. Thus, an application developer may notice that animation appears choppy at a certain point in the application, can use ADOBE SCOUT™ to identify the exact frames that are at issue, and then further analyze which of the activities performed in those frames are at issue.

Figure 2:
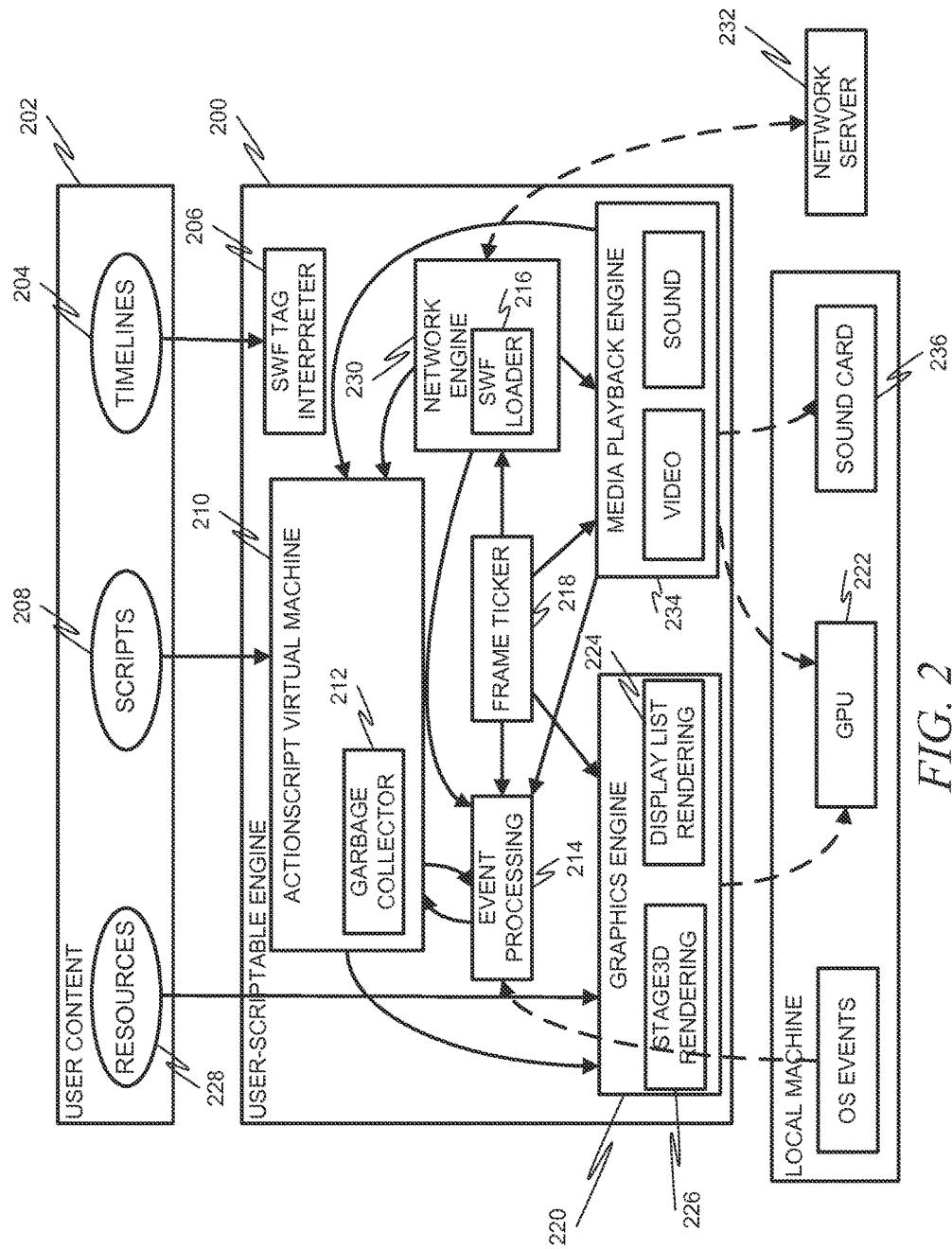
FIG. 2 is a block diagram illustrating a user-scriptable engine, such as ADOBE FLASH PLAYER™.

FIG. 2 is a block diagram illustrating a user-scriptable engine, such as ADOBE FLASH PLAYER™. The user-scriptable engine 200 may receive user content 202. The user content 202 may include timelines 204, which may be interpreted by a SWF tag interpreter 206 in the user-scriptable engine 200. The user content 202 may also include scripts 208, which may be executed by an ActionScript virtual machine 210 in the user-scriptable engine 200. The ActionScript virtual machine 210 implements certain core features of ActionScript, including garbage collection (by garbage collector 212) and exceptions, as well as acting as a bridge between the scripts 208 and the user-scriptable engine 200.

Event handlers (implemented in the event processing component 214) are functions that are registered by the programmer to get called when a specific event happens. Common events are navigation events (e.g., keyboard presses, mouse events, touch and gesture events, etc.) and window events (e.g., resize, full screen, etc.).

ActionScript can take care of the allocation and freeing of memory. The garbage collector 212 is used to scan for any objects that are no longer being referenced, and free up the memory they are using. A large amount of garbage collection means that there are too many objects being created; something the programmer may wish to learn about and address.

When the user-scriptable engine 200 starts a new user-scriptable engine instance, it first has to download the main SWF, parse it, and load it into memory before it can start to execute it. This is performed by the SWF loader 216.

A frame ticker 218 is a heartbeat that pulses whenever it is time for a new frame to start. At the start of each frame, it executes any timeline tags, invokes and frame scripts on the timeline, and dispatches a few key ActionScript events.

A graphics engine 220 may perform the acts of rendering the actual visuals of the frames, oftentimes utilizing a graphics processing unit (GPU) 222. A user-scriptable engine 200 may provide an abstraction from the graphics model exposed by the hardware and operating system in the form of higher-level graphics APIs. An example embodiment is display list rendering 224 in the ADOBE FLASH PLAYER™. Here, a blank canvas is provided known as a stage and the system draws to it and attaches and positions graphical entities known as display objects. Display objects may include, for example, vector art, bitmaps, text, etc., and they can be nested hierarchically to build a complicated scene. There are a number of steps that can occur when rendering a frame including, for example, calculating dirty regions (ones that include objects that have moved and need to be redrawn), rendering dirty regions, and copying to screen.

Another type of rendering that may be supported by the graphics engine 220 may be hardware-accelerated 3D rendering, such as Stage3D rendering 226. The basic structure of a Stage3D rendering cycle is to first set up a state of the GPU 222 (e.g., uploading textures, meshes, and shaders) and second to issue a number of draw calls that tell the GPU 222 to render batches of triangles to the target buffer. The finished image can then be presented to the screen.

As the graphics engine 220 operates, it consumes resources 228. These resources 228 may include bitmaps, images, meshes, shaders, etc.

A network engine 230, which may contain the previously mentioned SWF loader 216, may also be used to communicate with a network server 232 to provide streaming or other network services.

Video or sound may be run in a media playback engine 234, which can interface with both the GPU 222 and a sound card 236.

There are a number of different types of items in the user-scriptable engine 200 that can be monitored including, for example, CPU time, memory usage, GPU usage, function calls, etc. Generally, the method of collecting this information may be classified into either instrumentation or sampling. Instrumented data is data that is captured via additional program code, or hooks that an external process can attach to, embedded within the functions. In the case of the ADOBE FLASH PLAYER™, these functions are written in C++ and, for example, can be native function calls within the user-scriptable engine 200. They could, for example, and could have additional lines of code added to them which act to record data when the functions are executed. Lightweight instrumentation can be used in such instances, to reduce the overhead that can be attributed to the instrumentation itself. This instrumented data can be valuable, but it is typically implemented by a developer of a user-scriptable engine 200, and as such the choice of which functions to instrument cannot be easily modified. Sampled data, on the other hand, is interpreted dynamically at runtime. In the case of the ADOBE FLASH PLAYER™, the sampled functions are written in ActionScript.

Regardless of the source of the data, whether from a user-scriptable engine 200 having instrumented data and sampled data, or from a native application having only instrumented data or sampled data, each piece of data may be assigned a name. In an example embodiment, these names may be assigned to categories, which may be nested, or hierarchical in nature. For example, a particular text rendering function may be assigned to leaf category, such as "text rendering", and is therefore implicitly also a member of any parent categories, such as "rendering."

Generally there are two types of categories. The first is fixed categories. These are categories encompassing commonly executed blocks of code in the user-scriptable engine or application. This might include, for example, "rendering," "script execution," "garbage collection," etc. These are categories of data that commonly occur regardless of the content and, in an example embodiment, may be hard-coded into the profiler along with the names that map to the fixed categories. For example, the profiler designer may decide that all functions that start with ".rend" get assigned to the "rendering" category. In an example embodiment, filtering may also take place, especially for the less common categories, such that if no data winds up being assigned to the category, it may be filtered out (e.g., hidden from the user).

The second type of category is dynamic categories. Dynamic categories are those that depend on data that isn't available until runtime. Dynamic categories can be thought of as belonging to an infinite set (such as the set of all strings that are valid package names). Since the dynamic categories are infinite, they cannot be created statically and have data assigned to them. Rather, the categories are created as new data arrives that necessitates the need for a new category.

Figure 3:
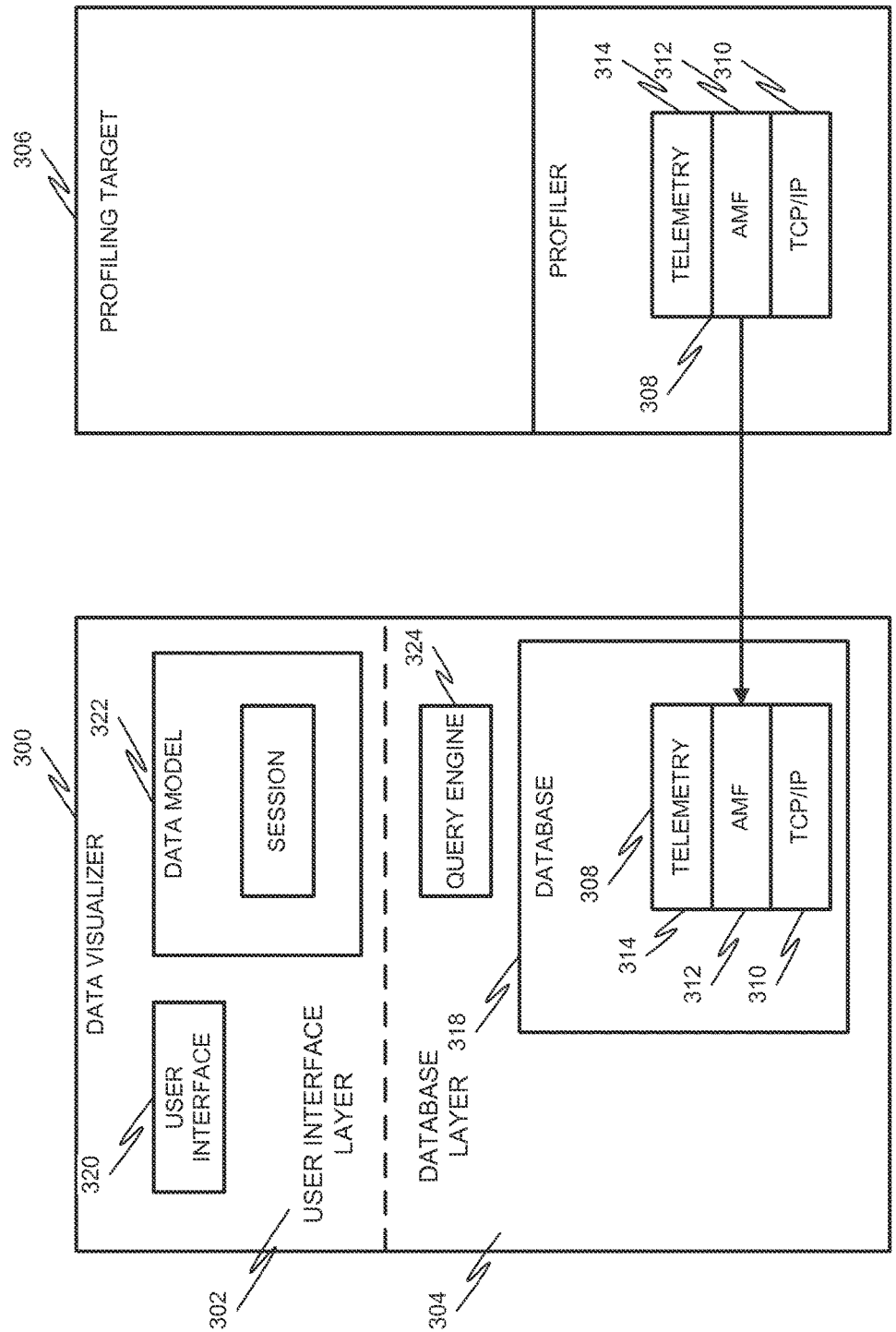
FIG. 3 is a block diagram illustrating a profiler in accordance with an example embodiment.

FIG. 3 is a block diagram illustrating a data visualizer 300 in accordance with an example embodiment. The data visualizer 300 may include a user interface layer 302 and a database layer 304. The user interface layer 302 may be constructed in a lightweight multi-paradigm programming language designed as a scripting language having extensible semantics, such as Lua. This is because the user interface layer 302 doesn't need to be fast, as it doesn't deal with as much data. The database layer 304 may be constructed in an object-oriented programming language, such as C++. This is because speed is important in the database layer 304.

The database layer 304 may interact with a profiling target 306 to receive data 308 from the profiling target 306. The profiling target 306 may be any system that contains or is connected to a profiler, whose data is sent to the data visualizer 300, but in an example embodiment may specifically be a user-scriptable engine, such as the user-scriptable engine 200 described in FIG. 2 and the corresponding text. The marshaling and unmarshaling of the data 308 may contain multiple layers. At the lowest layer, a networking protocol 310, such as TCP/IP, may be used to allow the data to be transferred via any number of different physical or wireless transmission mediums, such as Ethernet, IEEE 802.11 standards (Wi-Fi), Bluetooth, etc. The next layer 312 may be a format used to serialize objects. An example of such a format is the Action Message Format (AMF), which is a binary format used to serialize object graphs such as ActionScript objects and XML, or to send messages between user-scriptable engine clients and remote services. Another example is binary JavaScript Object Notation (JSON). At the top layer is a telemetry protocol 314, which encapsulates data about the operation of the profiling target 306 that is being monitored. As described earlier, this telemetry protocol 314 is a protocol layer having specific forms of data that are used for transmitting profiling data. The data may include instrumented data and/or sampled data, and may be hierarchical in nature. It should be noted that while telemetry protocol 314 is depicted as a single object, it typically is a stream of data. It should be noted that in some embodiments this stream may be sent as different Transport Control Protocol/Internet Protocol (TCP/IP) streams, where one stream comes from instrumentation and another stream comes from sampling.

A database 318 may receive and store the data 308 organized into sessions. A session is a discrete period of time during which monitoring occurs on a specific piece of content (e.g., a specific SWF being examined). A user may define the length of a session by, for example, selecting a recording button in the data visualizer 300 to begin recording telemetry and then selecting a stop button to stop recording the telemetry. The sessions can each store data from multiple streams.

The user interface layer 302 may include a user interface 320 and a data model 322. The data model 322 contains a state for each session, which contains a high-level view of the underlying data 308 as needed. When the user interface 318 receives instructions to navigate through the data 308, such as selecting a particular frame, or altering a frame selection, the instructions are passed through the data model 320 which sends a request to a query engine 324 in the database layer 304. The query engine 324 then generates one or more database queries based on the request, and sends them to the database 318, which returns the queried data to the data model 320, which can then arrange for the display of the new data in the user interface 318.

A number of screen captures illustrating various features of example embodiments will now be presented. It should be noted that the discussions of these screen captures will discuss various colors of elements of the screen captures. Due to the limitations of patent drawings, the colors of elements have been depicted as different patterns, such as hash lines. A legend is provided on each figure to indicate the color that each particular pattern corresponds to. Additionally, many of the textual elements of the screen captures are also intended to have color. To the extent a pattern is depicted behind or on top of text, this is intended to imply that the text itself is presented in the corresponding color, and not intended to imply that a rectangle or other shape containing the color is to be presented behind the text.

Figure 4A:
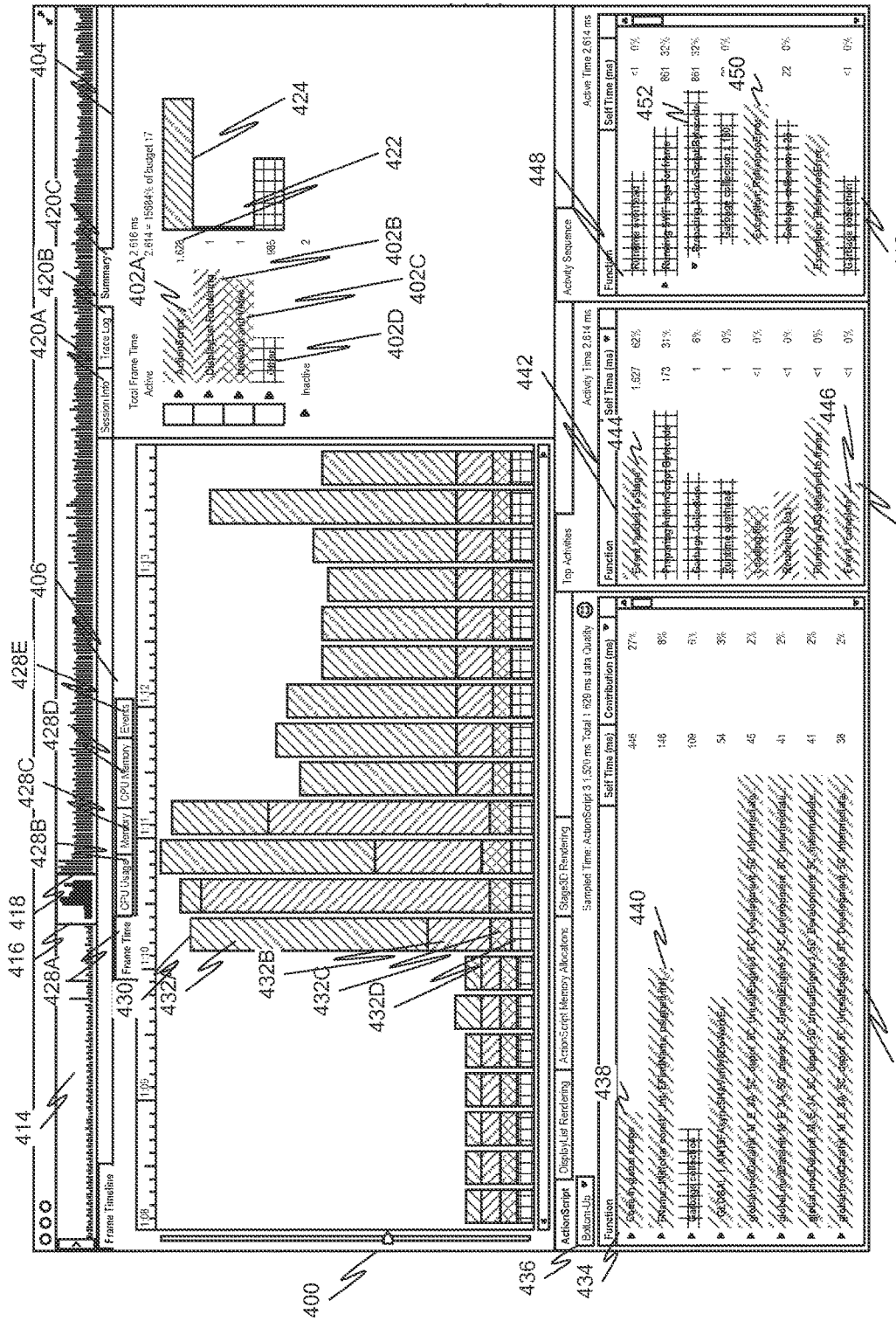
FIG. 4A is a screen capture illustrating a user interface, in accordance with an example embodiment, used to display hierarchical data.

FIG. 4 is a screen capture illustrating a user interface 400, in accordance with an example embodiment, used to display hierarchical data. In this example embodiment, each category 402A-402D of data at a particular level in the hierarchy is depicted in a different color. This color is then carried throughout multiple viewing regions 404, 406, 408, 410, 412, such that items related to a particular category are depicted in a consistent color throughout the entire user interface 400.

The user interface 400 also includes a temporal selection interface 414. The temporal selection interface 416 allows a user to select a portion of recorded data by, for example, defining starting 416 and ending 418 points. The data between the starting 416 and ending 418 points is then reflected in viewing region 406. Selection of frames in the viewing region 406 affects which data is displayed in the various other viewing regions 404, 408, 410, 412 of the user interface 400. This data represents data collected in multiple selected frames between the starting 416 and ending 418 points. Viewing region 404 depicts a summary view of the data.

A series of tabs 420A, 420B, 420C are provided to allow the user to select different panels to display. Here the user has selected tab 420C, which displays a summary of data. A series of categories 402A-402D are then displayed, along with a textual 422 and graphical 424 depiction of the data. Thus, for example, category 402A relates to ActionScript functions, which textual depiction 422 indicated took 1,628 ms, and graphical depiction 424 shows a bar line showing the amount of time relative to the other categories 402B, 402C, 402D. Notably, each of the displayed categories 402A, 402B, 402C, 402D are displayed in a different color. These colors are then consistent within the viewing region 404. While FIG. 4 is not shown in color, if one assumes that the color selected for the ActionScript category 402A is blue, then the text object for the ActionScript category 402A is depicted in blue, as is the graphical representation 424. The same is true for to the other categories 402B, 402C, 402D. Textual depiction 422 is not in color in this example embodiment, but may be in other embodiments.

Not only is the color consistent within viewing region 404, this color remains consistent throughout each of the other viewing regions 406, 408, 410, 412. Viewing region 406 is a graphical representation of the data viewed temporally, specifically a frame timeline. Thus, a time axis 426 is provided, and the data can be organized in slices of time. As with viewing region 404, the user may select different data measurements to depict, including frame time 428A, CPU 428B, memory 428C, GPU memory 428D, and events 428E. Notably, each time slice graphically depicts a total measurement across all categories (depicted as the total size of the bar line, such as bar line 430), along with visually breaking down this total measurement by category. In the time slice corresponding to bar line 430, for example, one can see the total CPU time used by frames in this time slice by viewing the total size of the bar line 430, but one can also see how much of this total CPU time was due to individual categories by viewing the individual segments 432A, 432B, 432C, 432D of the bar line 430. Notably, the coloring of the segments 432A, 432B, 432C, 432D correspond to the coloring of the categories provided in viewing region 404. The CPU time attributable to ActionScript, for example, is depicted in blue at segment 432A, allowing the user to easily tell that ActionScript has taken up a significant percentage of the CPU time in this time slice, without any labeling in the viewing region 406 needed to convey this information.

Viewing region 408 depicts an ActionScript panel, including a list 434 of function calls. A user can select drop-down menu 436 to select between depicting a top-down view, where the entry point of the call stack is at the top and the native calls are at the bottom of the stack, or a bottom-up view, wherein how much time is spent in individual functions is depicted. Here, the user has selected bottom-up. Notably, the function calls depicted in the list 434 are color-coded in the same manner as viewing region 404, 406. The function calls relating to ActionScript calls are depicted in blue, as can be seen in, for example, function call 438. Garbage collection, as can be seen in for example, 440, is depicted in orange, the same color as its parent category "other" 402D in viewing region 404. The data in the ActionScript panel may come from sampling.

Viewing region 410 depicts top activities within the data. Rather than breaking down time into high-level categories, this shows a detailed breakdown of activities 442, such as those handling specific events. Thus, the data in this panel is aggregated—it adds up all the time spent in a specific activity. The colors depicted for the activities 442 are consistent with the colors for the corresponding hierarchical categories as displayed in the other viewing regions 404, 406, 408, 412. Thus, for example, activity 444 is depicted as blue because the underlying activity, the event "addedToStage", is an ActionScript activity. Likewise, activity 446 is depicted as green because the underlying activity, the rendering of text, is a DisplayList rendering activity. Since the aggregation is at the level of the raw names given to the data as it was collected, the only indication of categories is by color. The data in viewing region 410 may come from instrumentation.

Viewing region 412 depicts the activity sequence. While viewing region 410 shows which activities are taking the most time, it can often be useful to see the precise sequence of each activity. Unlike viewing region 410, which aggregates data over multiple frames, viewing region 412 shows information for only a single frame, but shows the precise order and nesting of activities 448 in a single frame. It should be noted that data that falls below a certain threshold, such as activities that take less than 0.5 ms, can be filtered out of one or more of the viewing regions 404, 406, 408, 410, 412 to allow the user to concentrate on more time-consuming operations. In this example, it is filtered out of viewing regions 410 and 412, but not in the other viewing regions. The colors depicted for the activities 448 are consistent with the colors for the corresponding hierarchical categories as displayed in the other viewing regions 404, 406, 408, 410. Thus, for example, activity 450 is depicted as blue because its underlying activity, an exception, is an ActionScript activity. A parent activity, however, namely activity 452, which may have caused activity 450 to run, may be depicted in orange as its underlying activity, preparing ActionScript bytecode, and may fall under the "Other" category. It should be noted that the hierarchy of activities is distinct from, and orthogonal to, the hierarchy of categories. The data in viewing region 412 may come from instrumentation.

Figure 4B:
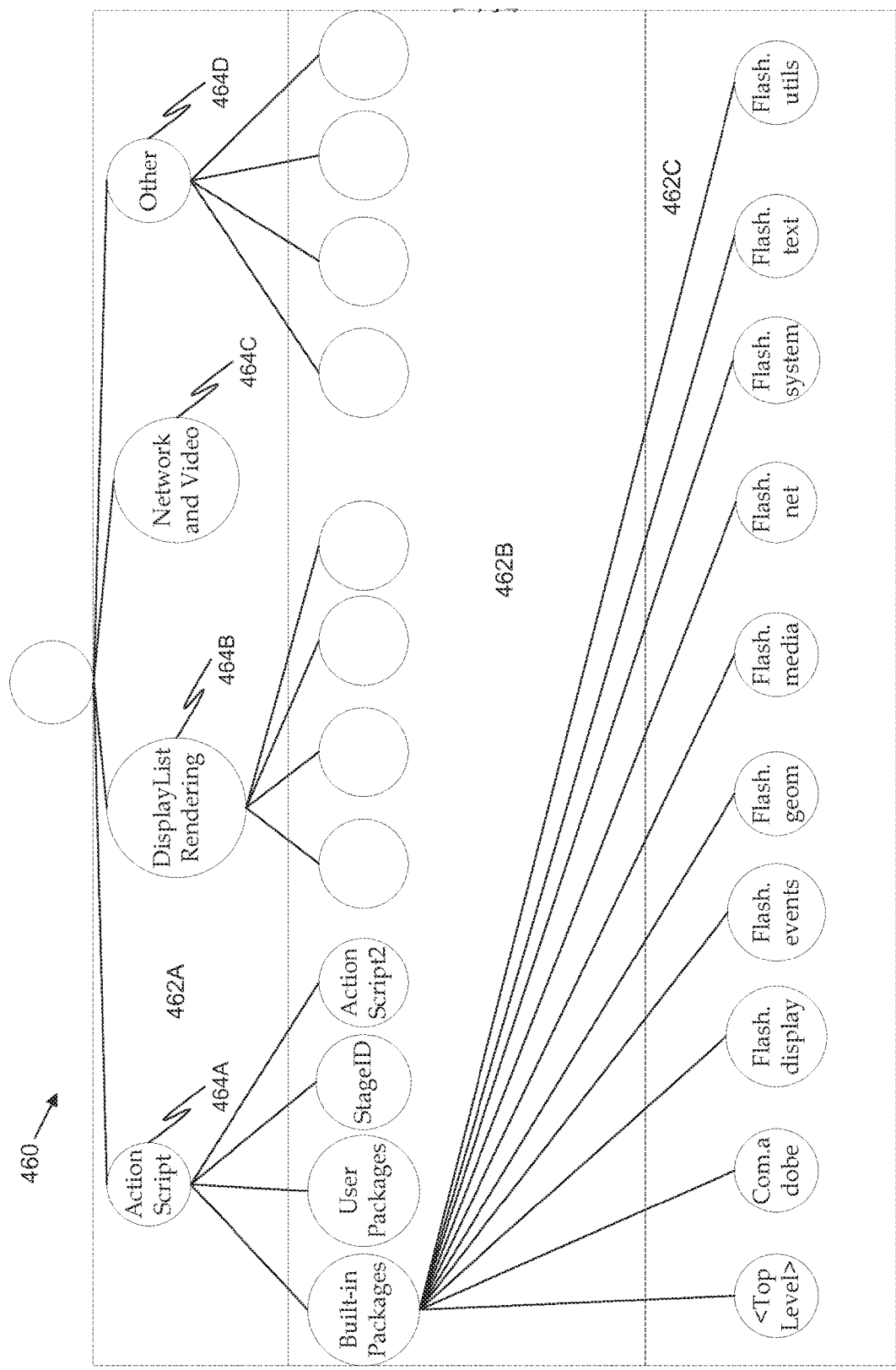
FIG. 4B is a diagram illustrating a tree representation of hierarchical data in accordance with an example embodiment.

FIG. 4B is a diagram illustrating a tree representation of hierarchical data in accordance with an example embodiment. Here, the tree 460 has multiple levels 462A, 462B, 462C. Nodes at the top level 462A include ActionScript 464A, DisplayList Rendering 464B, Network and Video 464C, and Other 464D. One or more of these nodes 462A-462B may contain subcategory nodes in level 462B, and one or more of the nodes in level 462B can contain nodes in level 462C, and so on, until only leaf nodes are reached.

Figure 5:
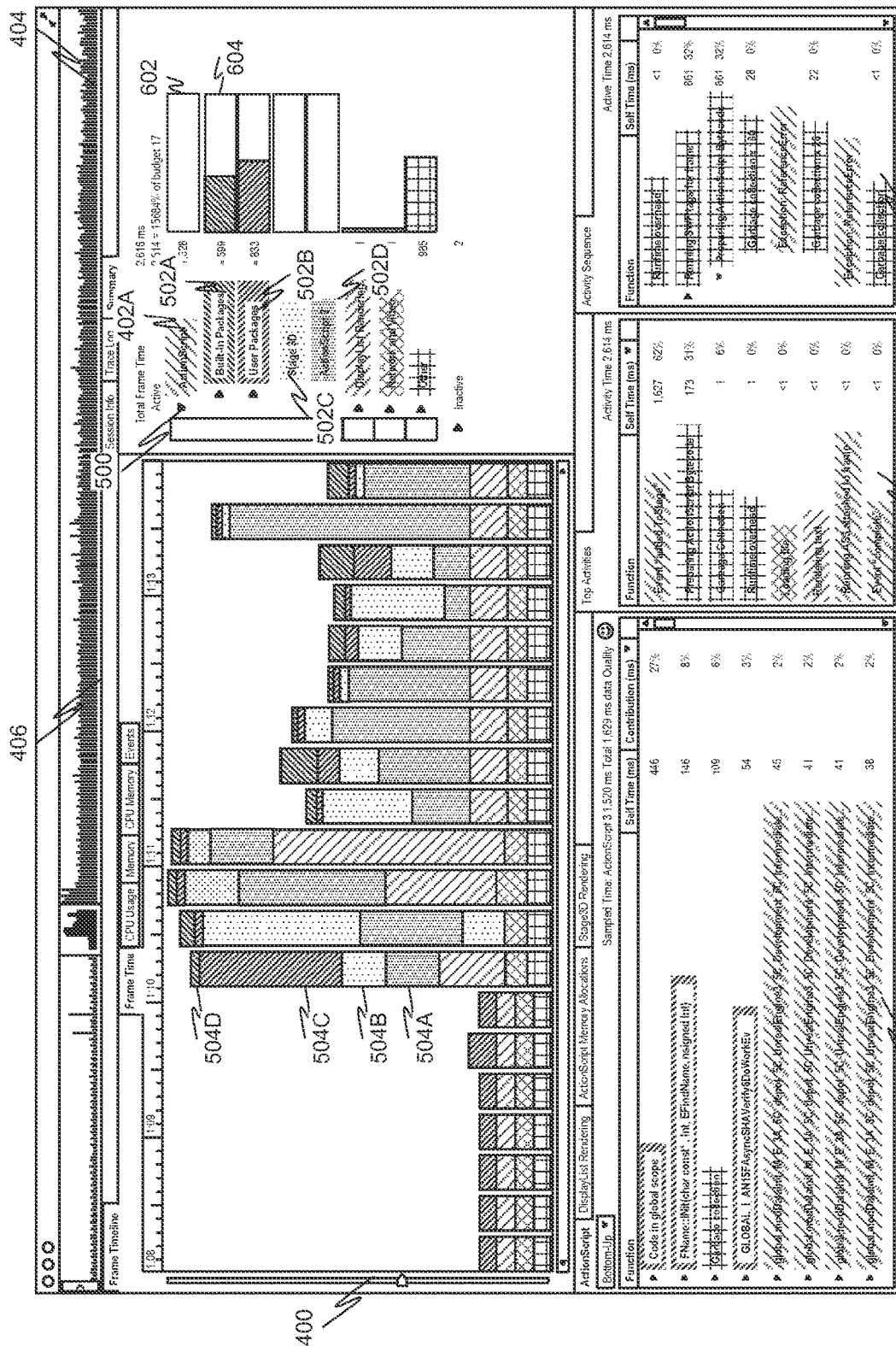
FIG. 5 is a screen capture illustrating the user interface 400, in accordance with an example embodiment, used to display hierarchical data, in another state following user interaction.

FIG. 5 is a screen capture illustrating the user interface 400, in accordance with an example embodiment, used to display hierarchical data, in another state following user interaction. Here, the user has elected to drill down on one of the categories of hierarchical data. Namely, the user has elected to drill down on the ActionScript category to reveal sub-categories within ActionScript. While the act of drilling down can occur in a number of ways and in a number of different locations (e.g., the user could elect to drill down by selecting objects in any of the viewing regions 404, 406, 408, 410, 412), in this example embodiment the only way for the user to drill down is by using viewing region 404. This is because it contains the master legend informing the system of what the categories are and what the colors mean. The color coding in the other viewing regions 406, 408, 410, 412 is driven by this. Here, the user has drilled down into the ActionScript category by selecting arrow 500 next to category 402A in viewing region 404. This opens up subcategories 502A, 502B, 502C, 502D of the ActionScript category 402A. Notably, each of these subcategories 502A, 502B, 502C, 502D is depicted in a different color, and each of the other viewing regions 406, 408, 410, 412 are updated to reflect the drill-down operation and also to maintain color consistency for these subcategories 502A, 502B, 502C, 502D, to the extent that the subcategories 502A, 502B, 502C, 502D are depicted in the other viewing regions 406, 408, 410, 412. For example, bar line 430 now has its ActionScript segment 432A broken further into subcategory segments 504A, 504B, 504C, 504D, with the colors of these subcategory segments 504A, 504B, 504C, 504D consistent with the coloring of the subcategories 502A, 502B, 502C, 502D in viewing region 404.

It should be noted that in an example embodiment, the colors selected to depict subcategories are related colors to the color of the parent category. A related color may be one in which an ordinary user would associate as a shade or type of another color. Such related colors may sometimes be referred to as shades, and in some embodiments determining what is or is not a related color may utilize a color wheel or color map that specifically identifies related colors. In an example embodiment, the colors selected to depict subcategories are shades of the color selected to depict the corresponding parent category. A shade of a color represents a color formed by mixing an original color with varying amounts of black. As black is removed from the original color, the shade of the original color is lightened, and the resultant color is a lighter shade of the original color. As black is added to the original color, the shade of the original color is darkened, and the resultant color is a darker shade of the original color. In the example embodiment of FIG. 5, the subcategories 502A, 502B, 502C, 502D are depicted as different shades of blue, because blue represents the parent category (ActionScript category 402A). It should be noted, however, that it is not necessary for each category to use related colors to depict corresponding subcategories. It is possible, for example, for the ActionScript category 402A to utilize shades of blue when depicting subcategories 502A, 502B, 502C, 502D, but for Other category 424D to not utilize shades of orange when depicting subcategories of its own, instead electing to utilize distinct and unrelated colors.

Figure 6:
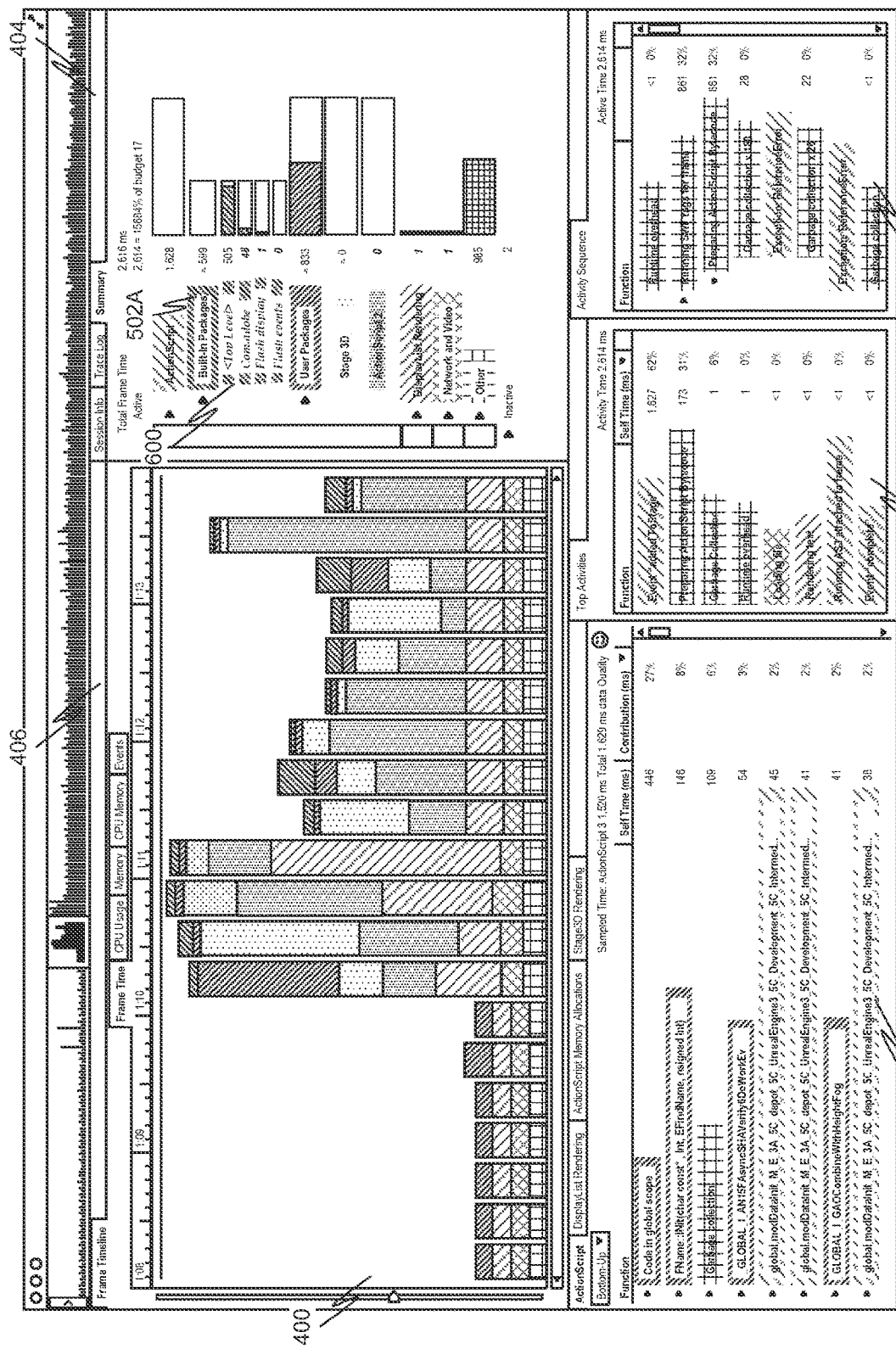
FIG. 6 is a screen capture illustrating the user interface, in accordance with an example embodiment, used to display hierarchical data, in another state following user interaction.

FIG. 6 is a screen capture illustrating the user interface 400, in accordance with an example embodiment, used to display hierarchical data, in another state following user interaction. Here, the user has elected to drill down on one of the subcategories of hierarchical data. Namely, the user has elected to drill down on the Built-in Packages subcategory 502A to reveal even further subcategories 600. In this example embodiment, these further subcategories 600 are not presented in different colors, and instead all match the color of the parent subcategory 502A. This is because this particular subcategory 502A contains arbitrary nesting, namely there are an arbitrary number of different packages that can be displayed if this subcategory 502A is drilled down upon. As such, the system has elected to not display these further subcategories 600 as individually color-coded because there is the possibility that there may not be enough colors (or related colors, depending upon implementation) to visibly distinguish the subcategories 600 from each other. In some example embodiments, however, the system could elect to color-code the subcategories much in the same way as described with respect to color-coding categories and subcategories in FIGS. 3-5 above. In some example embodiments, the system may determine exactly how many unique subcategories 600 are to be displayed and dynamically determine whether enough visually distinct colors can be found in order to color-code the subcategories (e.g., by determining if the number of unique subcategories 600 exceeds a predetermined threshold), and then color-code the subcategories if it determines that there are enough visually distinct colors.

It should also be noted that in some embodiments a nested bar chart may be shown in viewing region 404. As can be seen here, each time a category is drilled-down into, the aggregated data from its parent category may still be shown as a grayed out bar. For example, bar 602, representing a count of 1,628 for parent category 402A may also be depicted as bar 604 for subcategory 502A. This allows the user to easily see the relative count of each subcategory with respect to its parent category.

Figure 7:
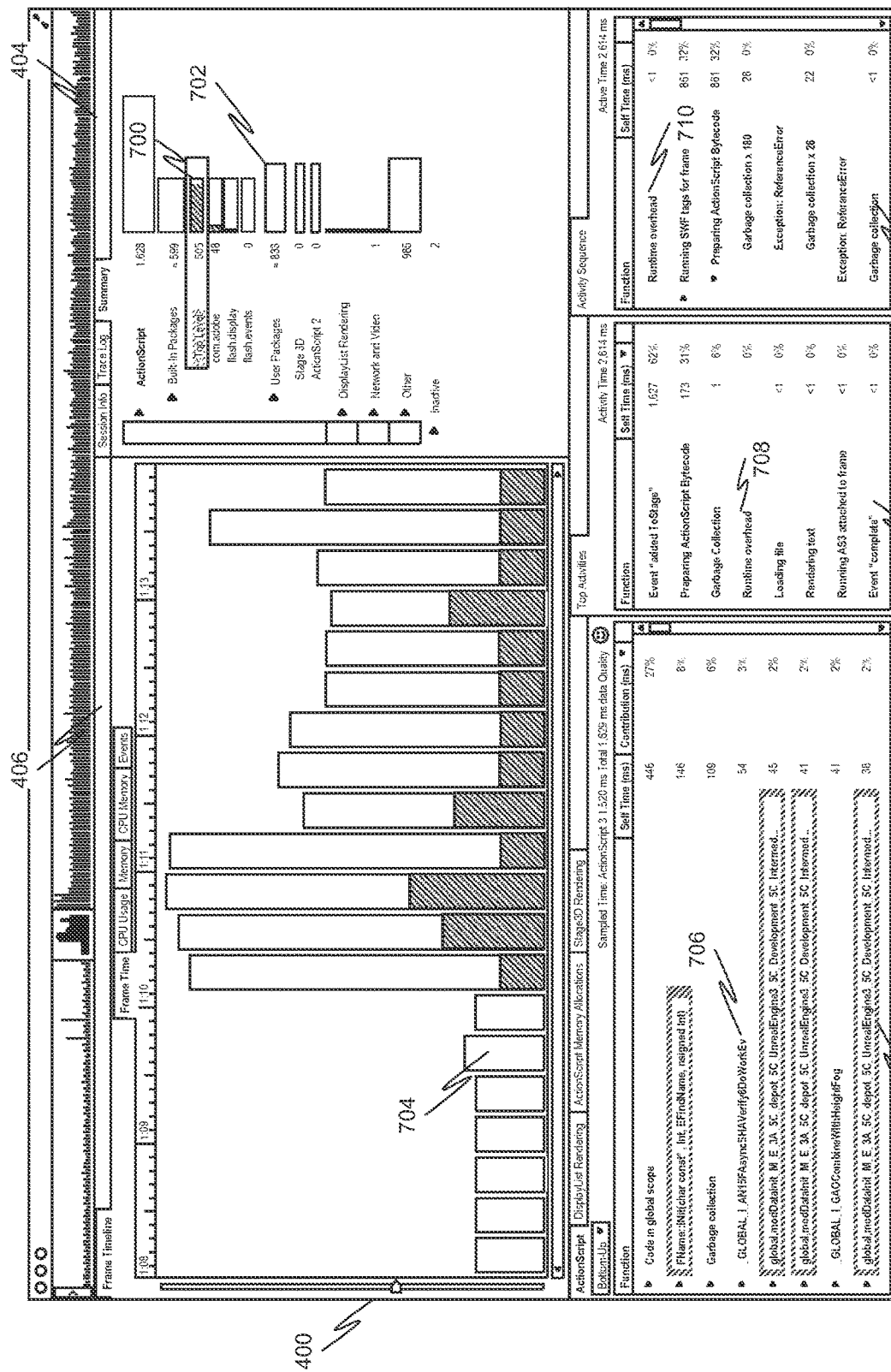
FIG. 7 is a screen capture illustrating the user interface, in accordance with an example embodiment, used to display hierarchical data, in another state following user interaction.

FIG. 7 is a screen capture illustrating the user interface 400, in accordance with an example embodiment, used to display hierarchical data, in another state following user interaction. Here, the user has elected to select one of the subcategories, specifically subcategory 700, representing "<Top Level>." This acts to filter the viewing regions 404, 406, 408, 410, 412 to gray out or otherwise hide data unrelated to this subcategory 700. As can be seen, only data related to <Top_Level> ActionScript activities is depicted in color in the viewing regions 404, 406, 408, 410, 412. Data related to other subcategories or categories are depicted as grayed out, such as at 702, 704, 706, 708, and 710. This allows a user to easily identify data of interest throughout the multiple viewing regions 404, 406, 408, 410, 412.

Figure 8:
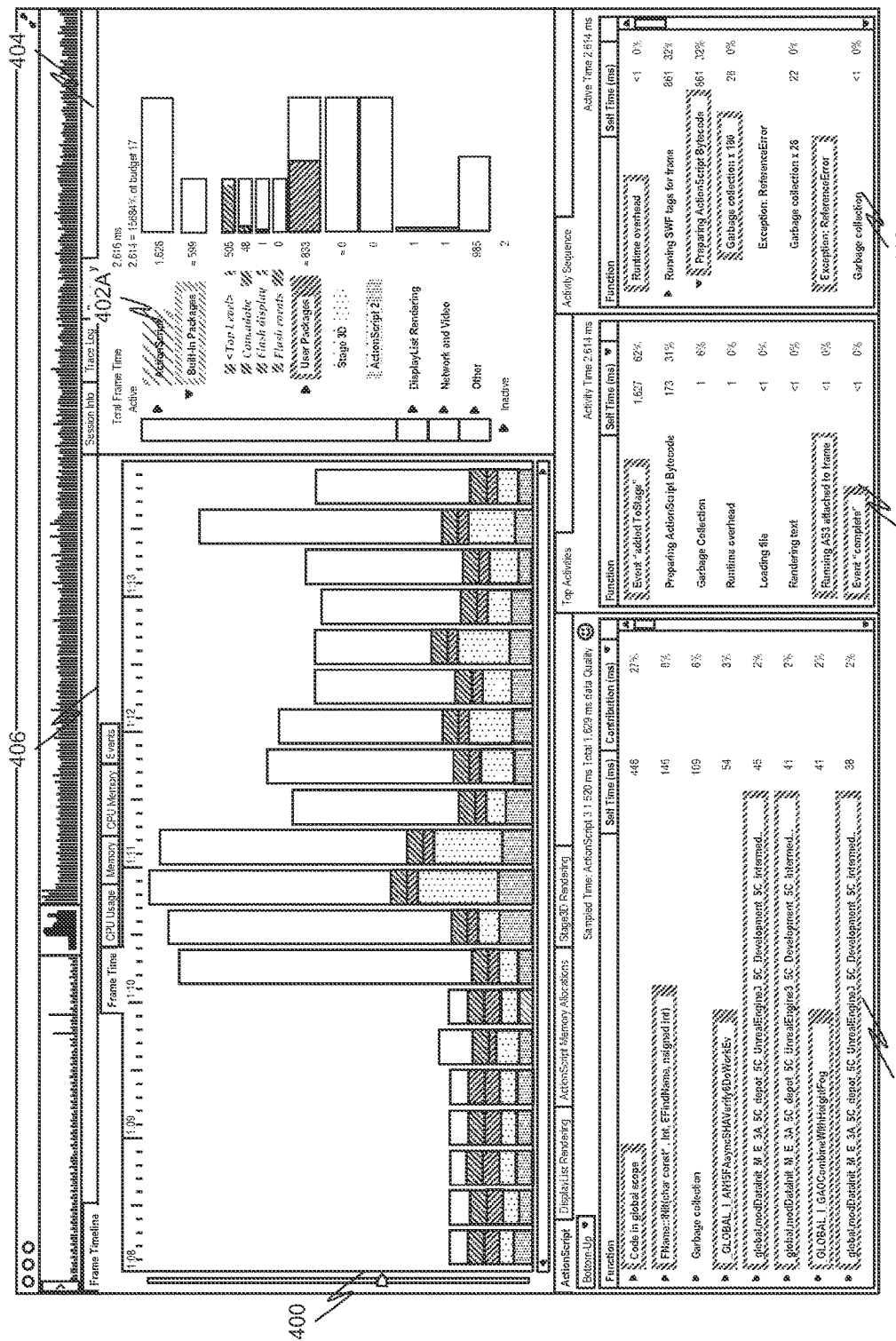
FIG. 8 is a screen capture illustrating the user interface, in accordance with an example embodiment, used to display hierarchical data, in another state following user interaction.

FIG. 8 is a screen capture illustrating the user interface 400, in accordance with an example embodiment, used to display hierarchical data, in another state following user interaction. Here, the user has elected to select one of the categories, specifically ActionScript category 402A. As in FIG. 7, this acts to filter the viewing regions 404, 406, 408, 410, 412 to gray out or otherwise hide data unrelated to the ActionScript category 402A.

Figure 9:
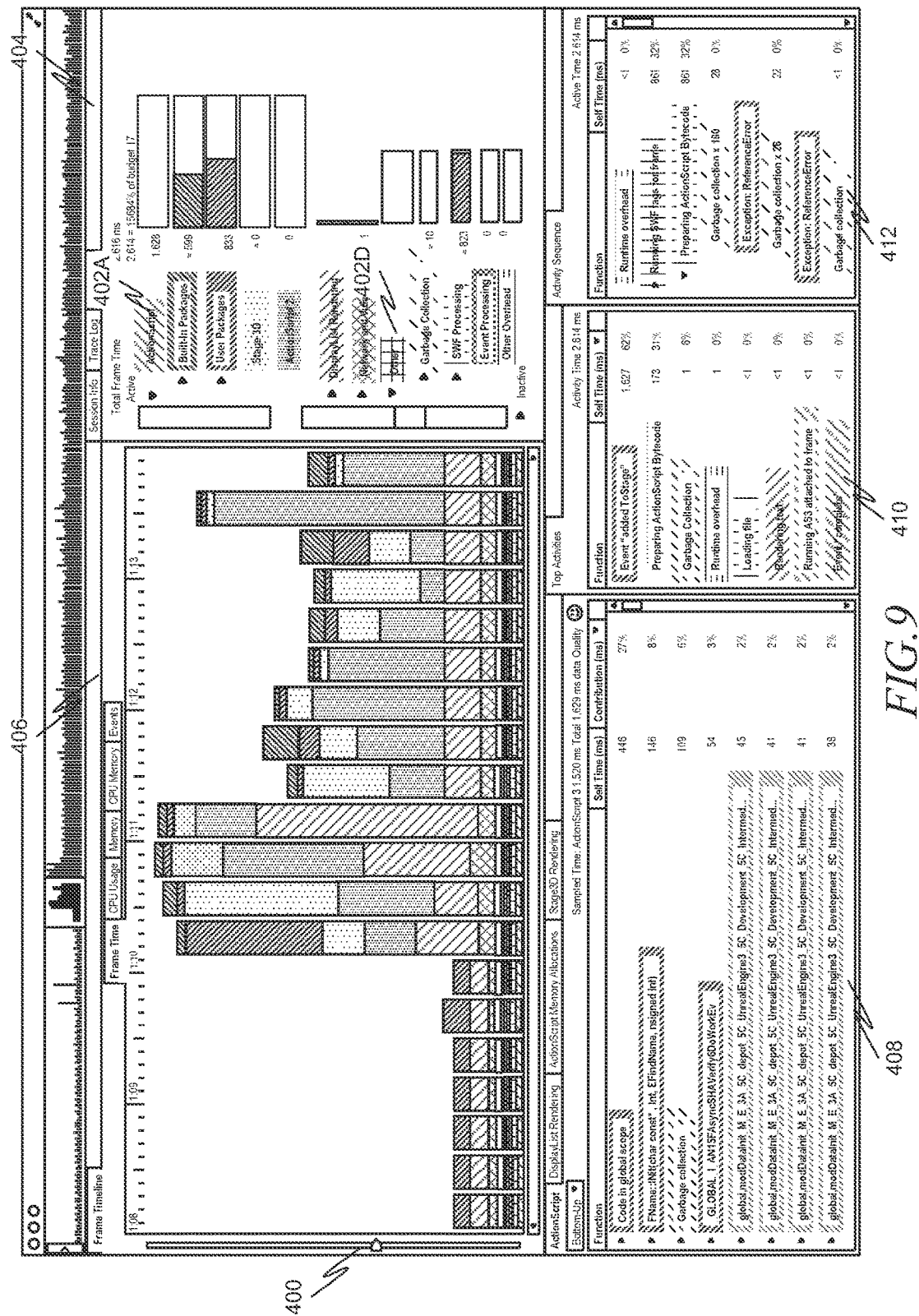
FIG. 9 is a screen capture illustrating the user interface, in accordance with an example embodiment, used to display hierarchical data, in another state following user interaction.

FIG. 9 is a screen capture illustrating the user interface 400, in accordance with an example embodiment, used to display hierarchical data, in another state following user interaction. Here the user has drilled down on multiple categories 402A, 402D. Subcategories of each are color-coded with shades of the parent categories 402A, 402D, and all of the colors are consistent for the same category/subcategory across all viewing regions 404, 406, 408, 410,

412. Selective drill-down is important, because it avoids having too many different colors on the screen at much. Since the user will normally only drill down into one category at a time, this helps them reveal only the granularity they want or need to see.

Figure 10:
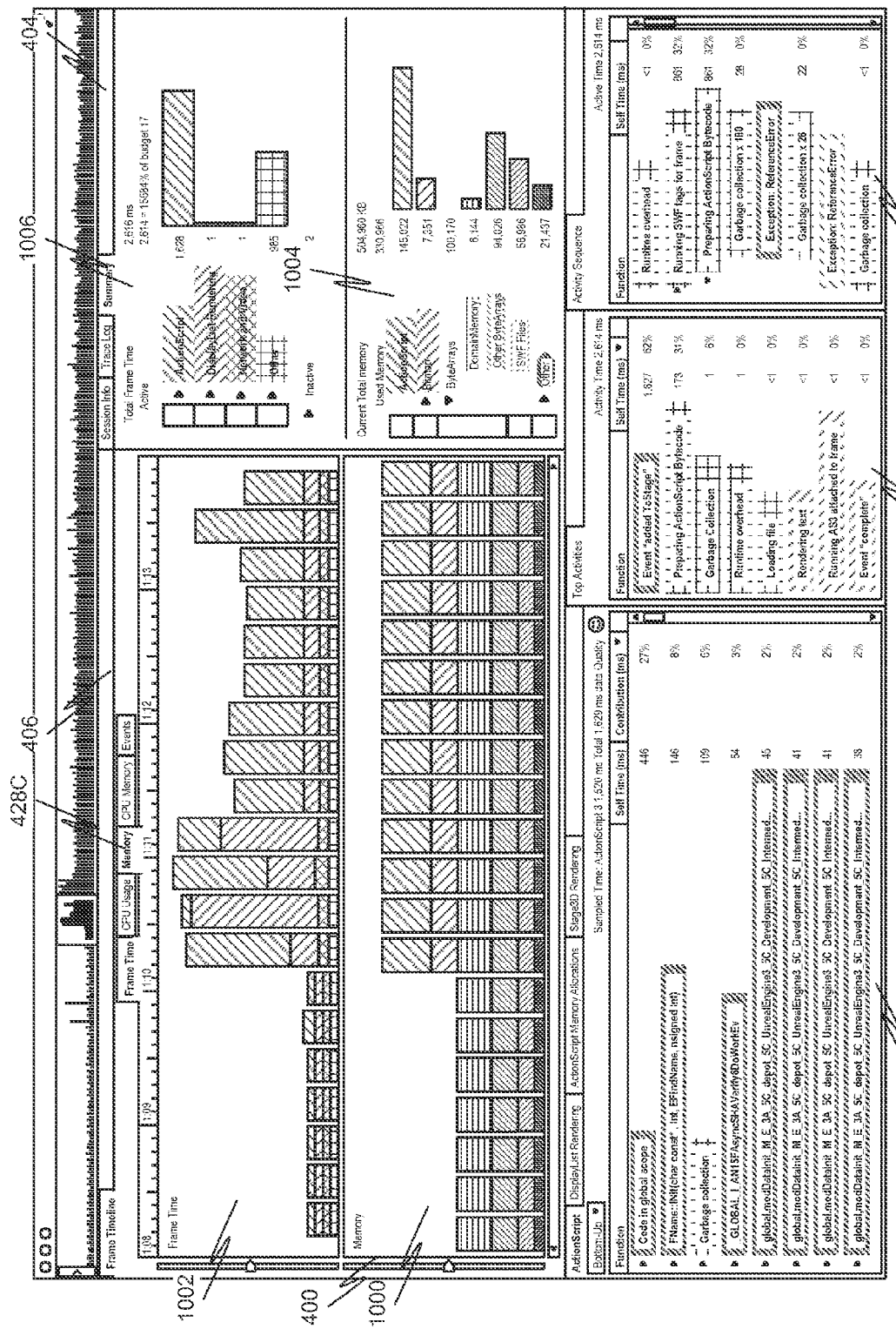
FIG. 10 is a screen capture illustrating the user interface, in accordance with an example embodiment, used to display hierarchical data, in another state following user interaction.

FIG. 10 is a screen capture illustrating the user interface 400, in accordance with an example embodiment, used to display hierarchical data, in another state following user interaction. Here the user has opened up a second tab in viewing region 406, memory 422B has been selected and a memory region 1000 is graphically displayed in viewing region 406 along with frame time region 1002. Notably, the colors used in memory region 1000 match the colors used in memory summary panel 1004, while the colors used in the frame time region 1002 match the colors used in the frame time summary panel 1006. This shows how multiple bar graphs can be shown simultaneously using consistently color-coded categories and subcategories among them.

It should be noted that while temporal selection interface 416 is depicted in FIGS. 3-10 as not being color-coded, in some example embodiments the temporal selection interface 416 can be color-coded in the same way as the other viewing regions 404, 406, 408, 410, 412.

Additionally, while the above embodiments described color-coding or otherwise consistently depicting the colors of categories and subcategories across multiple viewing regions, in some example embodiments other visual features may be used in conjunction with or in lieu of color-coding in order to distinguish categories or subcategories. For example, there may be so many different subcategories that merely color-coding each and every one of them may make it difficult to visually distinguish them from one another. In such cases, other visual elements may be added to help distinguish them.

Figure 11:
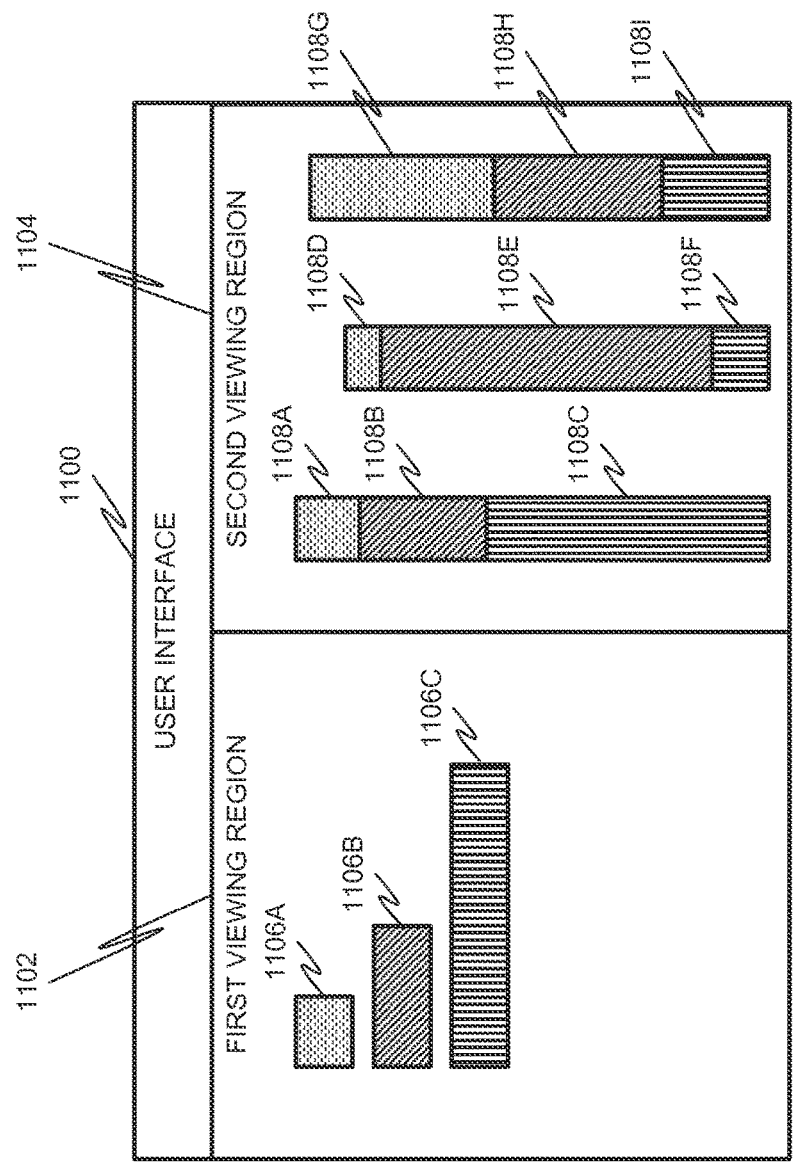
FIG. 11 is a diagram illustrating a user interface, in accordance with an example embodiment, for visually depicting hierarchical data.

FIG. 11 is a diagram illustrating a user interface 1100, in accordance with an example embodiment, for visually depicting hierarchical data. Here, the user interface 1100 simultaneously displays at least two viewing regions 1102, 1104. The first viewing region 1102 depicts a first view of the hierarchical data, including depicting a plurality of objects 1106A-1106C. Each of the plurality of objects 1106A-1106C is color-coded. Specifically, each of the plurality of objects 1106A-1106C is depicted in a color selected to represent the category to which the object 1106A-1106C corresponds. The second viewing region 1104 depicts a second view of the hierarchical data, including depicting a plurality of objects 1108A-1108I. Each of these objects 1108A-1108I is also color-coded to depict a color selected to represent the category to which the object 1108A-1108I corresponds. An object corresponding to a particular category in the first view is depicted in an identical color to the object corresponding to the same category in the second view.

Figure 12:
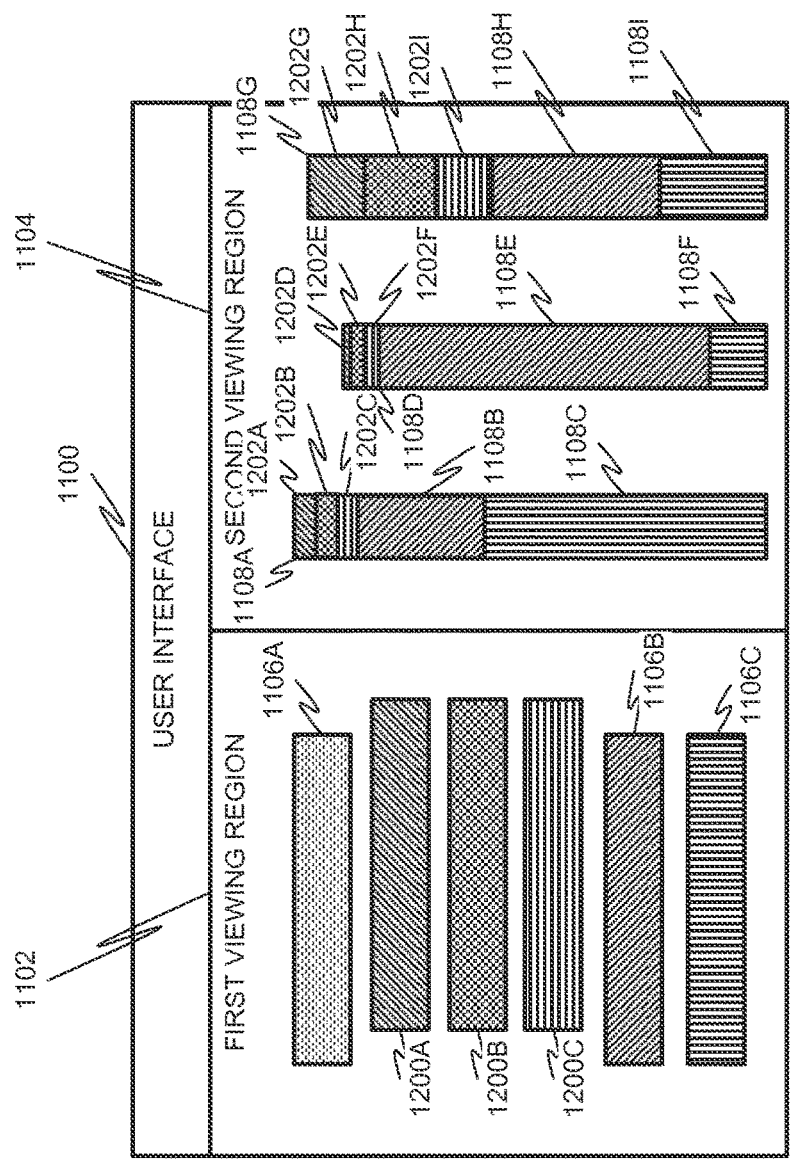
FIG. 12 is a diagram illustrating a user interface, in accordance with an example embodiment, for visually depicting hierarchical data after a drill-down operation is performed.

FIG. 12 is a diagram illustrating a user interface 1100, in accordance with an example embodiment, for visually depicting hierarchical data after a drill-down operation is performed. Here, object 1106A, representing a category of the hierarchical data, has been drilled down into via user input. Additional objects 1200A-1200C are then displayed, each corresponding to a subcategory within the category. Each of these additional objects 1200A-1200C is color-coded. Specifically, each of the additional objects 1200A-1200C is depicted in a color selected to represent the subcategory to which the object 1200A-1200C corresponds. The second viewing region 1104 also now is updated to reflect these subcategories, displaying additional objects 1202A-1202I within objects 1108A, 1108D, and 1108G. Each of these additional objects 1202A-1202I is also color-coded to depict a color selected to represent the subcategory to which the additional object 1202A-1202I corresponds. An object corresponding to a particular subcategory in the first view is depicted in an identical color to the object corresponding to the same subcategory in the second view.

Figure 13:
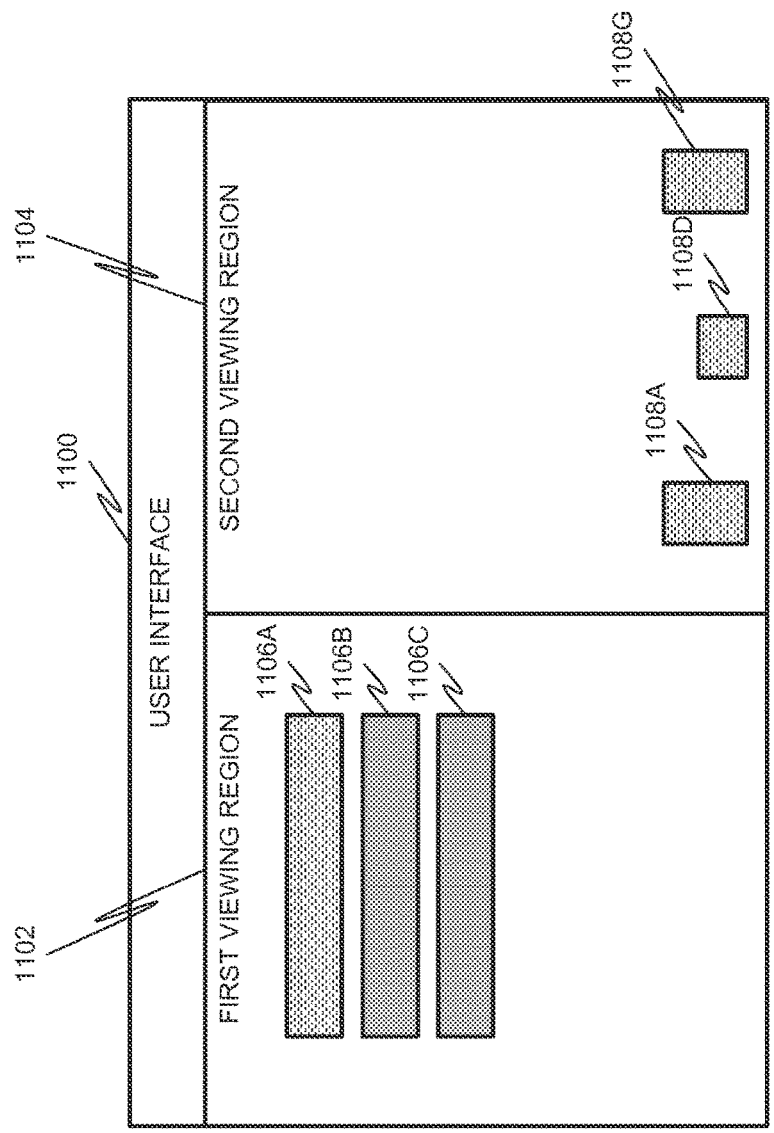
FIG. 13 is a diagram illustrating a user interface, in accordance with an example embodiment, for visually depicting hierarchical data after an object selection is performed.
Figure 14:
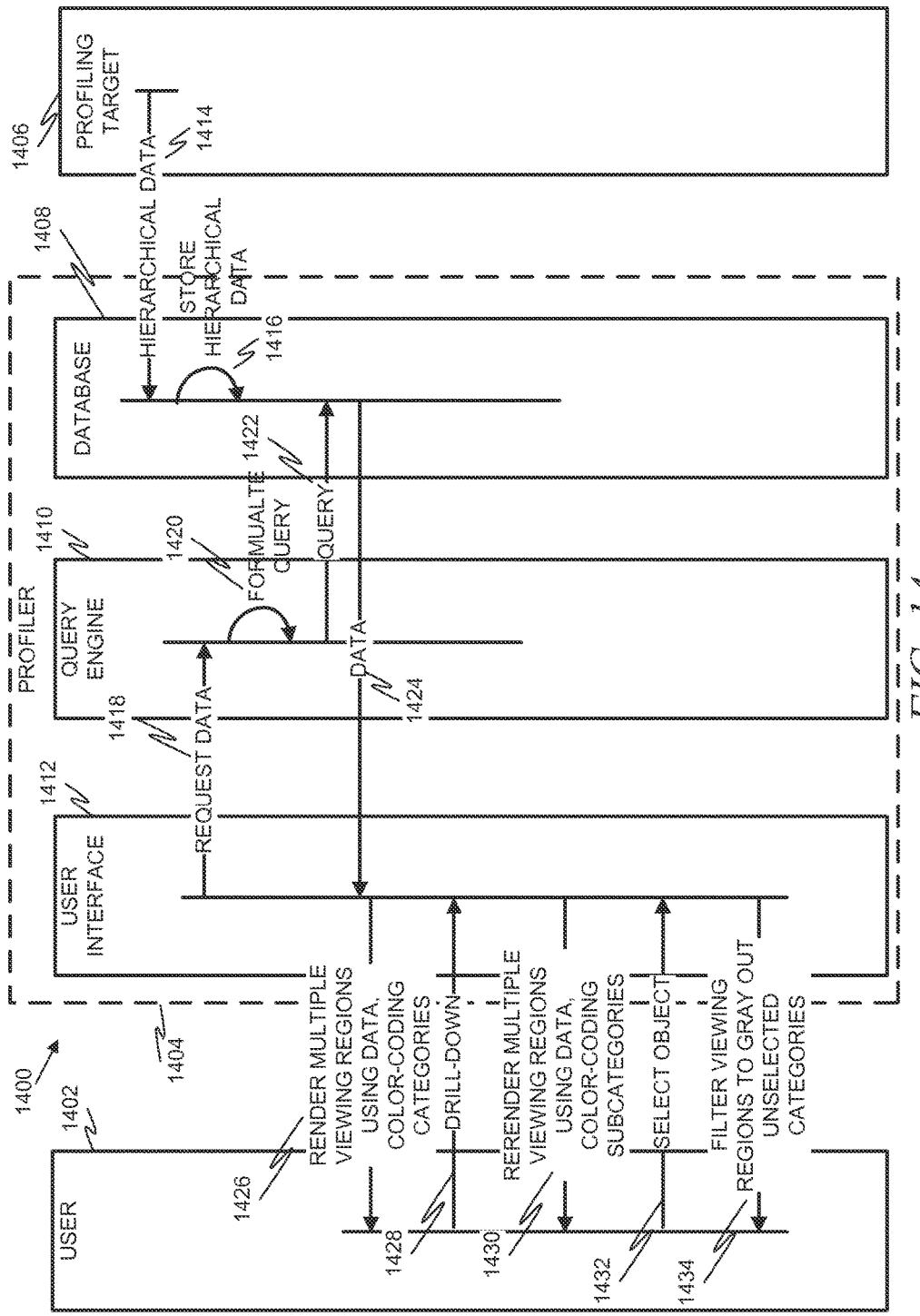
FIG. 14 is an interaction diagram illustrating a method, in accordance with an example embodiment, of visually depicting hierarchical data.

FIG. 13 is a diagram illustrating a user interface 1100, in accordance with an example embodiment, for visually depicting hierarchical data after an object selection is performed. Here, object 1106A, corresponding to a particular category of the hierarchical data, has been selected. All of the objects 1106B-1106C, 1108B, 1108C, 1108E, 1108F, 1108H, and 1108I in both viewing regions 1102, 1104 are now grayed out, leaving only objects 1106A, 1108A, 1108D, 1108G that correspond to the particular category of hierarchical data displayed in color.

At operation 1428, the user interface 1412 may receive a drill-down operation from the user 1402. At operation 1430, the user interface 1412 re-renders the plurality of viewing regions to include objects pertaining to subcategories of data being displayed in each viewing region with color-coding having a different color for each subcategory, such as that an object corresponding to a first subcategory in the first viewing region is displayed in an identical color as an object corresponding to the first subcategory in the second viewing region.

At operation 1432, the user interface 1412 may receive an object selection operation form the user 1402. At operation 1438, the user interface 1412 may then filter the viewing regions so that objects corresponding to categories or subcategories other than the category or subcategory corresponding to the selected object are grayed out. Notably this may be done without accessing the query engine 1410 as no additional data from the database 1408 is needed for this operation.

Figure 15:
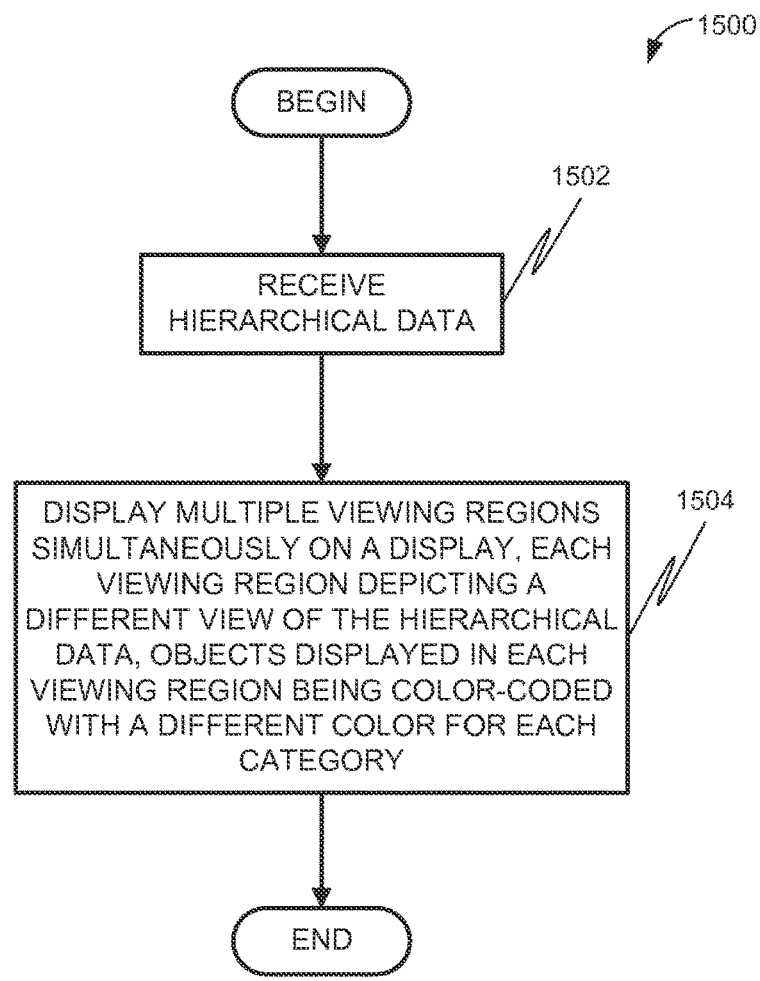
FIG. 15 is a flow diagram illustrating a method, in accordance with an example embodiment, of visually depicting hierarchical data.

FIG. 15 is a flow diagram illustrating a method 1500, in accordance with an example embodiment, of visually depicting hierarchical data. At operation 1502 hierarchical data is received, the hierarchical data including data pertaining to a plurality of categories, the hierarchical data further including data pertaining to a plurality of subcategories of at least one of the plurality of categories. At operation 1504, multiple viewing regions are displayed simultaneously on a display, each viewing region depicting a different view of the hierarchical data, objects displayed in each viewing region being color-coded with a different color for each category, such that an object corresponding to a first category in a first viewing region is displayed in an identical color as an object corresponding to the first category in the second viewing region.

It should be noted that while embodiments have been described that pertain to profiling telemetry or other data from a user-scriptable engine or other software application, the present disclosure is not limited to such implementations and can be applied broadly to any hierarchical data. For example, financial data, which may include a number of asset portfolios, could also be depicted using the user interfaces described herein.

Figure 16:
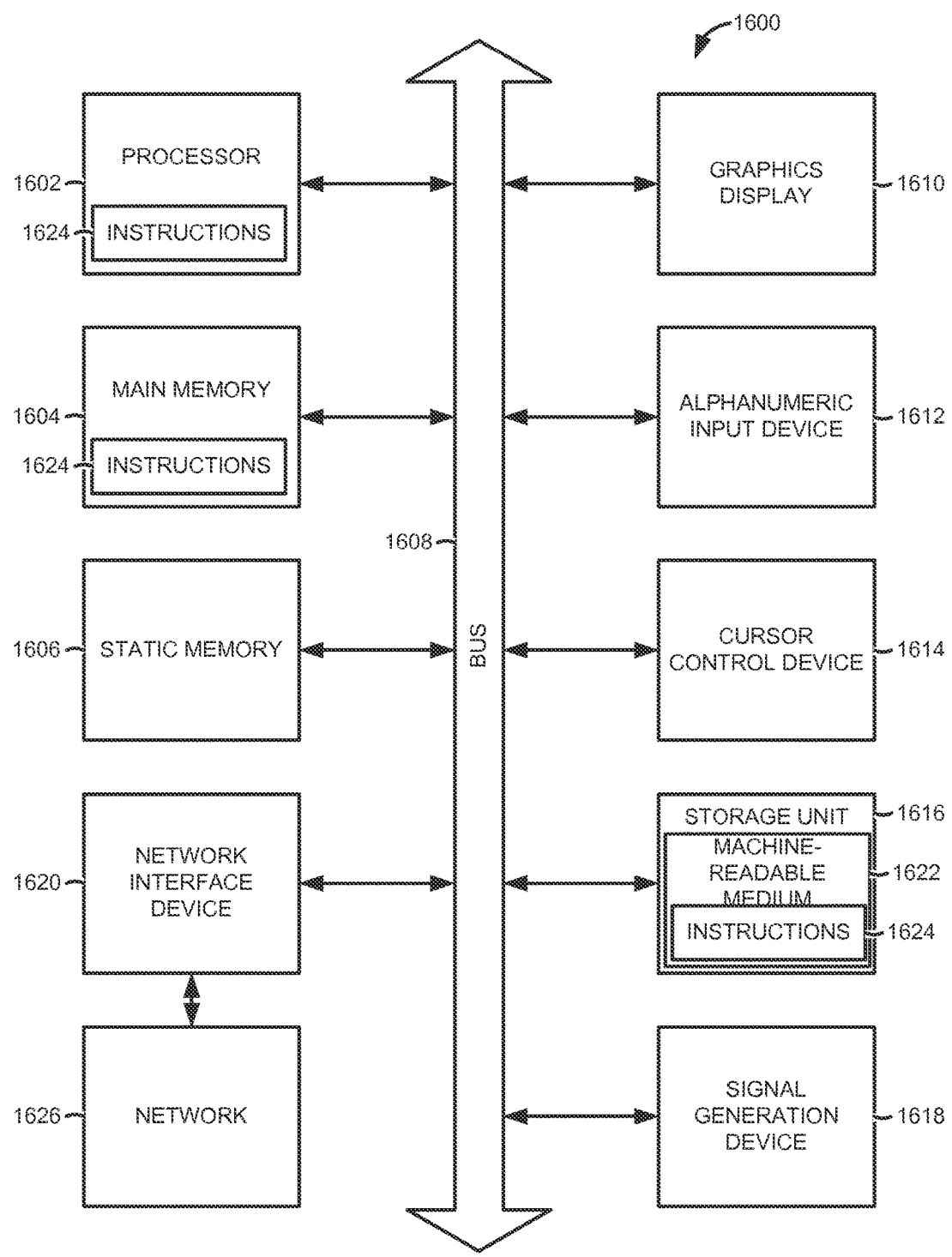
FIG. 16 is a block diagram of a computer processing system, within which a set of instructions may be executed for causing the computer to perform any one or more of the methodologies discussed herein.

FIG. 16 is a block diagram of a computer processing system 1600, within which a set of instructions 1624 may be executed for causing the computer processing system 1600 to perform any one or more of the methodologies discussed herein.

Embodiments may also, for example, be deployed by Software-as-a-Service (SaaS), application service provider (ASP), or utility computing providers, in addition to being sold or licensed via traditional channels. The computer processing system 1600 may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1600 includes processor 1602 (e.g., a central processing unit (CPU), a graphics processing unit (GPU) or both), main memory 1604 and static memory 1606, which communicate with each other via bus 1608. The processing system 1600 may further include graphics display unit 1610 (e.g., a plasma display, a liquid crystal display (LCD) or a cathode ray tube (CRT)). The processing system 1600 also includes alphanumeric input device 1612 (e.g., a keyboard), a cursor control device 1614 (e.g., a mouse, touch screen, or the like), a storage unit 1616, a signal generation device 1618 (e.g., a speaker), and a network interface device 1620.

The storage unit 1616 includes machine-readable medium 1622 on which is stored one or more sets of instructions 1624 and data structures (e.g., software) embodying or utilized by any one or more of the methodologies or functions described herein. The instructions 1624 may also reside, completely or at least partially, within the main memory 1604 and/or within the processor 1602 during execution thereof by the processing system 1600, the main memory 1604 and the processor 1602 also constituting machine-readable, tangible media.

The instructions 1624 may further be transmitted or received over network 1626 via a network interface device 1620 utilizing any one of a number of well-known transfer protocols (e.g., HTTP).

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions 1624. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

What is claimed is:

1. A computerized method of visually depicting hierarchical data, the method comprising:
    accessing hierarchical data, the hierarchical data including data pertaining to a plurality of categories, the hierarchical data further including data pertaining to a plurality of subcategories of at least one of the plurality of categories;
    providing for display multiple different viewing regions simultaneously, each viewing region depicting a different view of the hierarchical data, objects displayed in each viewing region being color-coded with a different color for each category, such that an object corresponding to a first category in a first viewing region is displayed in an identical color as an object corresponding to the first category in a second viewing region, wherein the object corresponding to the first category in the first viewing region comprises a function call textual object and the object corresponding to the first category in the second region comprises a graphical object;
    receiving user input indicating a selection of a particular object in either the first or second viewing region; and
    filtering the first and second viewing regions such that colors selected for categories other than the category to which the particular object relates are gray, thus causing only objects relating to the category to which the particular object relates to be displayed in color.

2. The method of claim 1, wherein the displaying multiple viewing regions simultaneously includes displaying objects corresponding to a plurality of subcategories of one of the plurality of categories, each object corresponding to the plurality of subcategories being color-coded with a different color for each subcategory, such that an object corresponding to a first subcategory in the first viewing region is displayed with an identical color as an object corresponding to the first subcategory in the second viewing region.

3. The method of claim 2, the color selected for each of the plurality of subcategories of a particular category being a shade of the color selected for the particular category.

4. The method of claim 2, the objects corresponding to the plurality of subcategories of a particular category being displayed in response to user input indicating a drill-down operation on the particular category.

5. The method of claim 1, the graphical objects including bar lines of a bar graph.

6. The method of claim 1, the hierarchical data including performance data relating to a user-scriptable engine used to view and interact with multimedia.

7. The method of claim 6, the user-scriptable engine including native functions and user-defined functions, the hierarchical data including instrumented data relating to performance of the native functions and sampled data relating to performance of the user-defined functions.

8. The method of claim 7, the instrumented data and sampled data being received as separate streams.

9. A non-transitory machine-readable storage medium comprising a set of instructions which, when executed by a processor, causes execution of operations comprising:
   accessing hierarchical data, the hierarchical data including data pertaining to a plurality of categories, the hierarchical data further including data pertaining to a plurality of subcategories of at least one of the plurality of categories;
   assigning each piece of the hierarchical data to one of the plurality of categories, the categories comprising fixed categories encompassing commonly executed blocks of code in a user-scriptable engine or application and dynamic categories that depend on data not available until runtime;
   providing for display multiple different viewing regions simultaneously, each viewing region depicting a different view of the hierarchical data, objects displayed in each viewing region being color-coded with a different color for each category, such that a first object corresponding to a first category in a first viewing region is displayed in a first identical color as a second object corresponding to the first category in a second viewing region and a third object corresponding to a second category in the first viewing region is displayed in a second identical color as a fourth object corresponding to the second category in the second viewing region;
   receiving an indication of a selection of the first category; and
   based on the selection of the first category, filtering the first viewing region and the second viewing region to deemphasize objects unrelated to the selection of the first category, wherein the first object and the second object corresponding to the first category remain displayed in the first identical color, and the third object and the fourth object corresponding to the second category are deemphasized by displaying the third object and fourth object in a gray-scale color.

10. The non-transitory machine-readable storage medium of claim 9, the set of instructions further causing execution of the displaying multiple viewing regions simultaneously including displaying objects corresponding to a plurality of subcategories of one of the plurality of categories, each object corresponding to the plurality of subcategories being color-coded with a different color for each subcategory, such that an object corresponding to a first subcategory in the first viewing region is displayed with an identical color as an object corresponding to the first subcategory in the second viewing region.

11. The non-transitory machine-readable storage medium of claim 10, the color selected for each of the plurality of subcategories of a particular category being a shade of the color selected for the particular category.

12. The non-transitory machine-readable storage medium of claim 10, the objects corresponding to the plurality of subcategories of a particular category being displayed in response to user input indicating a drill-down operation on the particular category.

13. A system for visually depicting hierarchical data comprising:
   one or more processors; and
   a machine-readable hardware storage device coupled with the one or more processors, the machine-readable hardware storage device storing instructions that, when executed by the one or more processors, cause the system to perform operations comprising:
      accessing hierarchical data, the hierarchical data including data pertaining to a plurality of categories, the hierarchical data further including data pertaining to a plurality of subcategories of at least one of the plurality of categories;
      assigning each piece of the hierarchical data to one of the plurality of categories, the categories comprising fixed categories encompassing commonly executed blocks of code in a user-scriptable engine or application and dynamic categories that depend on data not available until runtime;
      providing for display multiple different viewing regions simultaneously, each viewing region depicting a different view of the hierarchical data, objects displayed in each viewing region being color-coded with a different color for each category, such that a first object corresponding to a first category in a first viewing region is displayed in a first identical color as a second object corresponding to the first category in a second viewing region and a third object corresponding to a second category in the first viewing region is displayed in a second identical color as a fourth object corresponding to the second category in the second viewing region;
      receiving an indication of a selection of the first category; and
      based on the selection of the first category, filtering the first viewing region and the second viewing region to deemphasize objects unrelated to the selection of the first category, wherein the first object and the second object corresponding to the first category remain displayed in the first identical color, and the third object and the fourth object corresponding to the second category are deemphasized by displaying the third object and fourth object in a gray-scale color.

14. The system of claim 13, the operations further comprising:
   causing execution of the displaying multiple viewing regions simultaneously including displaying objects corresponding to a plurality of subcategories of one of the plurality of categories, each object corresponding to the plurality of subcategories being color-coded with a different color for each subcategory, such that an object corresponding to a first subcategory in the first viewing region is displayed with an identical color as an object corresponding to the first subcategory in the second viewing region.

15. The system of claim 13, wherein the color selected for each of the plurality of subcategories of a particular category being a shade of the color selected for the particular category.

16. The system of claim 13, wherein the objects corresponding to the plurality of subcategories of a particular category being displayed in response to user input indicating a drill-down operation on the particular category.

17. The system of claim 13, the hierarchical data including performance data relating to a user-scriptable engine used to view and interact with multimedia.

18. The system of claim 17, the user-scriptable engine including native functions and user-defined functions, the hierarchical data including instrumented data relating to performance of the native functions and sampled data relating to performance of the user-defined functions.

19. The system of claim 18, the instrumented data and sampled data being received as separate streams.

\* \* \* \* \*